REISSUE-DESIGN.

A. BUERMANN.

SPUR.

No. 10,321. Reissued May 1, 1883.

Attest:
John C. Tunbridge.
Fred. Voigt.

Inventor:
August Buermann
by Chas. H. Pile
Atty

N. PETERS, Photo-Lithographer, Washington, D. C.

UNITED STATES PATENT OFFICE.

AUGUST BUERMANN, OF NEWARK, NEW JERSEY.

DESIGN FOR A SPUR.

SPECIFICATION forming part of Reissued Design Letters Patent No. 10,321, dated May 1, 1883.

Original No. 11,715, dated March 30, 1880, for 7 years. Application for reissue filed March 15, 1883.

*To all whom it may concern:*

Be it known that I, AUGUST BUERMANN, a citizen of the United States, residing at Newark, in the county of Essex and State of New Jersey, have invented and produced a new and original Design for Spurs, of which the following is a specification, reference being had to the accompanying drawings, forming a part thereof.

Figure 1:
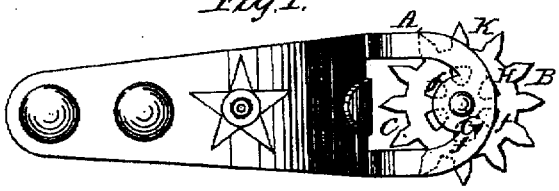
Figure 2:
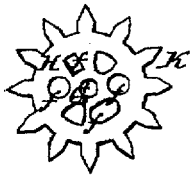

In said drawings, Figure 1 is a side view of my newly-designed spur, and Fig. 2 is a detached view of the rowel.

Heretofore spurs provided with rowels have been made with "spur-points" projecting, in said rowels, outward from an imperforate portion lying adjacent to the center opening.

The leading features of my design for a spur consist in forming said spur with a rowel having openings arranged between the central opening and the peripheral portions thereof, and in further details, all of which will be hereinafter set forth and embodied in the claims.

The general configuration of my device is as follows: The rowel B is provided with openings *f*, which may be of any form shown desired, a variety of forms being shown in Fig. 2. Said openings are arranged around the central pivotal opening in the rowel, between it and the peripheral portions H K. The said rowel B is arranged between the rowel-arms A, which arms are rounded at their outer extremities and formed with openings therethrough, so that when said rowel is in position between the said arms the open-work of the rowel is shown through the openings in the said rowel-arms. The peculiarly ornamental effect of the rowel herein described is apparent, however, whether the rowel-arms are shaped as shown and described or not.

What I claim is—

1. In a design for spurs, the rowel provided with perforations or openings *f*, arranged around the central opening, G, between said central opening and the peripheral portions of the rowel, as shown and described.

2. The design for a spur, the same consisting in a spur having therein the arms A, with openings C therein, and the perforated rowel B, as shown and described.

In testimony that I claim the foregoing I have hereunto set my hand this 28th day of February, 1883.

AUGUST BUERMANN.

In presence of—

CHARLES H. PELL,

JOHN C. TUNBRIDGE.